US010534989B2

(12) United States Patent
Tokuda et al.

(10) Patent No.: US 10,534,989 B2
(45) Date of Patent: Jan. 14, 2020

(54) SENSOR-FUNCTION-EQUIPPED DISPLAY, ARTICLE, PACKAGING MATERIAL, AND QUALITY MANAGEMENT METHOD

(71) Applicant: Hitachi, Ltd., Chiyoda-ku, Tokyo (JP)

(72) Inventors: Yuya Tokuda, Tokyo (JP); Tomotoshi Ishida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 84 days.

(21) Appl. No.: 15/740,101

(22) PCT Filed: Jun. 29, 2016

(86) PCT No.: PCT/JP2016/069193
§ 371 (c)(1),
(2) Date: Dec. 27, 2017

(87) PCT Pub. No.: WO2017/010282
PCT Pub. Date: Jan. 19, 2017

(65) Prior Publication Data
US 2018/0189621 A1 Jul. 5, 2018

(30) Foreign Application Priority Data
Jul. 10, 2015 (WO) .................. PCT/JP2015/069819

(51) Int. Cl.
*G06K 19/07* (2006.01)
*G01K 11/12* (2006.01)
(Continued)

(52) U.S. Cl.
CPC .......... *G06K 19/0717* (2013.01); *G01K 11/12* (2013.01); *G06K 7/1434* (2013.01); *G06K 19/0614* (2013.01); *G06Q 10/087* (2013.01)

(58) Field of Classification Search
CPC ................................................ G06K 19/0717
(Continued)

(56) References Cited

U.S. PATENT DOCUMENTS

2012/0104106 A1    5/2012  Nemet et al.
2012/0105566 A1*   5/2012  Ishii .................... B41J 2/32
                                              347/217
(Continued)

FOREIGN PATENT DOCUMENTS

JP     11-248552 A    9/1999
JP    2001-194248 A   7/2001
(Continued)

OTHER PUBLICATIONS

International Search Report (PCT/ISA/210) issued in PCT Application No. PCT/JP2016/069193 dated Sep. 13, 2016 with English-language translation (three (3) pages).
(Continued)

*Primary Examiner* — Allyson N Trail
(74) *Attorney, Agent, or Firm* — Crowell & Moring LLP

(57) ABSTRACT

The purpose of the present invention is to enable a machine-read mark to also determine, with high probability, a management state to be normal when a visual mark has determined the management state to be normal, in cases when the visual mark and the machine-read mark, which are provided with a sensor function for detecting an abnormality in the same management state, are present on one product, even if there is variation in the quality of the marks. At least two barcodes or marks for managing the safety of one and the same product are provided. The barcodes and marks are provided with a function with which the safety of the product is confirmed as a result of a change in a property thereof, such as the color or shape, caused by an external factor that may reduce the safety of the product. The at least two barcodes or marks are provided with the function with which the safety of the product is confirmed as a result of a change in a property thereof caused by the same external factor. The at least two barcodes or marks having properties which change as a result of the same external factor are (Continued)

provided with at least two threshold values which determine that the safety of the same product has reduced.

11 Claims, 4 Drawing Sheets

(51) Int. Cl.
    *G06K 7/14*         (2006.01)
    *G06K 19/06*       (2006.01)
    *G06Q 10/08*       (2012.01)

(58) Field of Classification Search
    USPC .................................................. 235/462.01
    See application file for complete search history.

(56) References Cited

U.S. PATENT DOCUMENTS

| | | | | |
|---|---|---|---|---|
| 2012/0313994 A1* | 12/2012 | Ishii | ........................... | B41J 2/32 |
| | | | | 347/17 |
| 2014/0276536 A1* | 9/2014 | Estes | ................. | A61M 5/14244 |
| | | | | 604/500 |
| 2015/0366006 A1* | 12/2015 | Ben-Shmuel | .......... | H05B 6/645 |
| | | | | 219/747 |
| 2018/0136052 A1* | 5/2018 | Nemet | ................... | G01K 11/12 |

FOREIGN PATENT DOCUMENTS

| | | |
|---|---|---|
| JP | 2002-37420 A | 2/2002 |
| JP | 2015-64886 A | 4/2015 |
| WO | WO 2009/063464 A2 | 5/2009 |
| WO | WO 2010/134061 A1 | 11/2010 |

OTHER PUBLICATIONS

Japanese-language Written Opinion (PCT/ISA/237) issued in PCT Application No. PCT/JP2016/069193 dated Sep. 13, 2016 (three (3) pages).
International Search Report (PCT/ISA/210) issued in PCT Application No. PCT/JP2015/069819 dated Aug. 18, 2015 with English-language translation (three (3) pages).
Japanese-language Written Opinion (PCT/ISA/237) issued in PCT/JP2015/069819 dated Aug. 18, 2015 (four (4) pages).
Extended European Search Report issued in counterpart European Application No. 16824262.6 dated Jan. 7, 2019 (10 pages).

* cited by examiner

Fig. 2
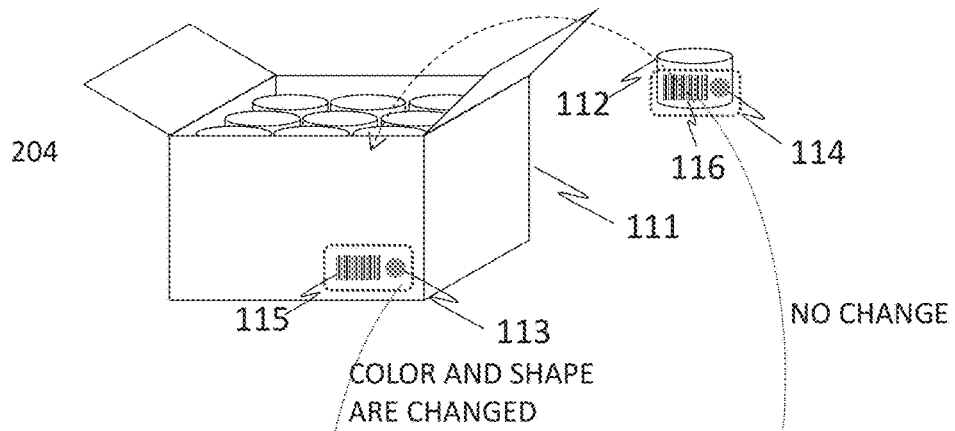
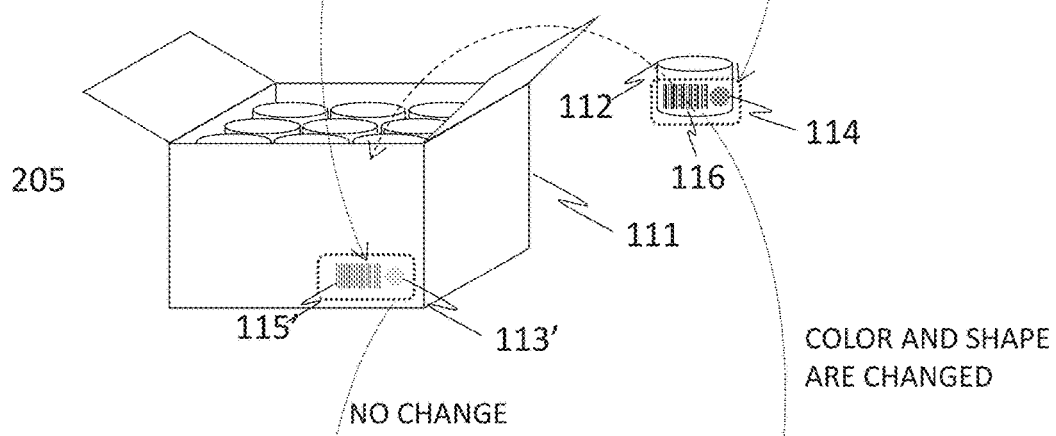
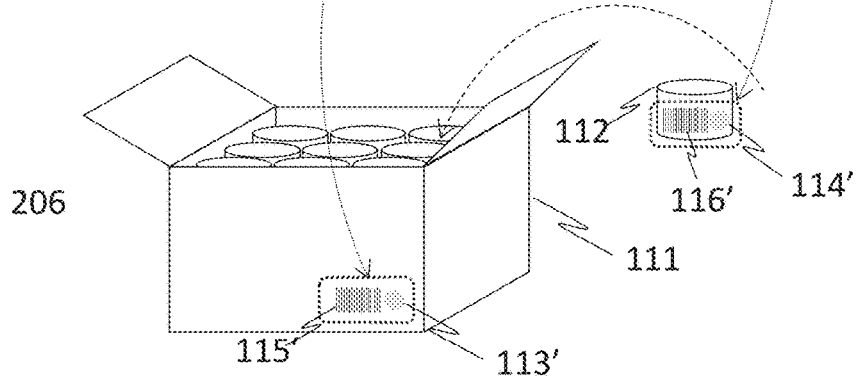

Fig. 4
- STAMP SEAL:  301
- SIGNATURE:  302
- CORPORATE MARK: 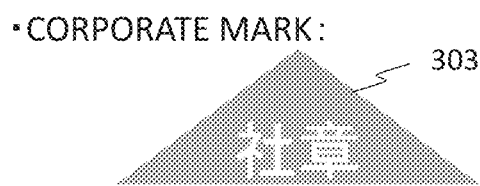 303
- EMBLEM: 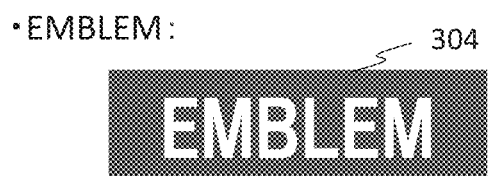 304
- FAMILY CREST:  305
- LOGOTYPE: 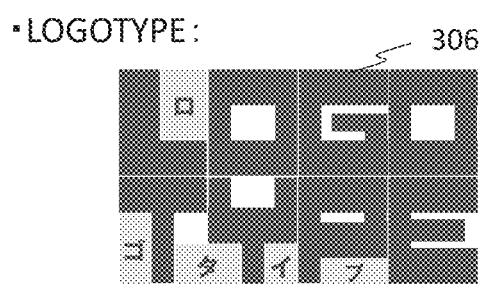 306
- DESIGN DRAWING: 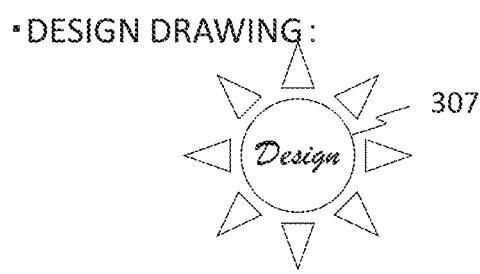 307
- CIRCLE:  308
- OVAL:  309
- STAR:  310
- TRIANGLE:  311
- RECTANGLE:  312
- POLYGON:  313
- X-MARK:  314
- ARROW:  315
- MESSAGE:  316

SENSOR-FUNCTION-EQUIPPED DISPLAY, ARTICLE, PACKAGING MATERIAL, AND QUALITY MANAGEMENT METHOD

TECHNICAL FIELD

The present invention relates to a sensor-function-equipped display, an article, a packaging material, and a quality management method.

BACKGROUND ART

In a case where products such as medicine and food are transported or stored, in some cases, a sensor for recording a management state such as a temperature or humidity is attached to product main bodies, a box for transport, a truck for transport, or the like in order to guarantee quality of the products. A kind of sensor for recording a management state is a sensor-function-equipped mark. As a method of reading this sensor-function-equipped mark, there are two types of methods, i.e., visual observation by a human and reading by a machine. A sensor-function-equipped mark read by visual observation is advantageous in that a manager or consumer can determine normality or abnormality of a management state without using a machine. Meanwhile, a sensor-function-equipped mark read by a machine, such as a barcode or a matrix-type two-dimensional code, is advantageous in that data can be formed because the sensor-function-equipped mark is read by a machine. Those sensor-function-equipped marks are required to, in a case where abnormality of a management state is detected, warn a manager or consumer about abnormality of a product by changing color, shapes, or the like.

PTL 1 discloses a technology of recording a management state of a temperature by using a mark that is suitable for reading by visual observation and is printed in a temperature-indicating ink in the vicinity of a barcode attached to a package of food. In this technology, in a case where a temperature of a product becomes equal to or more than a prescribed temperature, color of the mark is changed so that the mark warns a manager or consumer of the product.

PTL 2 discloses a technology of recording a management state of a temperature by using a plurality of barcodes printed in a temperature-indicating ink. In this technology, readability/unreadability of each barcode is switched in a different temperature zone. Therefore, it is possible to determine the highest and lowest temperatures during transport and storage by reading a readable mark for machine reading.

CITATION LIST

Patent Literature(s)

PTL 1: JP-A-2001-194248
PTL 2: JP-A-2015-64886

SUMMARY OF INVENTION

Technical Problem(s)

In a case where two or more sensor-function-equipped marks for detecting state abnormality of the same management state exist, in, for example, a store that sells food, an employee first checks a management state by using a mark with which state abnormality can be detected by visual observation and, in a case where abnormality is detected, replaces the abnormal product with another normal product. In a case where normality is confirmed by using the mark read by visual observation, then a mark read by a machine, such as a barcode or a matrix-type two-dimensional code, is read by using a machine such as a barcode reader. At this time, in a case where a detection result of the mark read by visual observation conflicts with a detection result of the mark read by a machine, determination varies among employees and consistency of product management is lost in some cases. Therefore, it is necessary that, even in a case where there is variation in characteristics of marks, in a case where a mark read by visual observation determines that a management state is normal, a mark read by a machine also determines that the management state is normal with high probability.

PTL 1 and PTL 2 disclose that a sensor-function-equipped mark is one of a mark read by visual observation and a mark read by a machine and do not clearly disclose a case where a sensor-function-equipped mark read by visual observation and a sensor-function-equipped mark read by a machine for detecting state abnormality of the same management state exist.

An object of the invention is to provide more preferable quality management by simultaneously providing a plurality of sensor-function-equipped displays having thresholds. Further, an embodiment of the invention provides a technology in which, in a case where a sensor-function-equipped mark read by visual observation and a sensor-function-equipped mark read by a machine for detecting state abnormality of the same management state exist and the mark read by visual observation determines that the management state is normal, the mark read by a machine can also determine that the management state is normal with high probability even in a case where there is variation in characteristics of marks.

Solution to Problem(s)

In order to achieve the above object, the technology of the invention has the following features. An article including a plurality of displays whose appearances are changed on the basis of the same kind of external factor, in which: a threshold of the external factor that changes an appearance of a first display and a threshold of the external factor that changes an appearance of a second display are different; and the appearances of the first display and the second display are differently changed. Alternatively, a quality management method of an article including a plurality of displays whose appearances are changed on the basis of the same kind of external factor, in which: a threshold of the external factor that changes an appearance of a first display and a threshold of the external factor that changes an appearance of a second display are different; and the first display is read by visual observation and the second display is read by a machine.

Advantageous Effects of Invention

The invention can provide more preferable quality management by simultaneously providing a plurality of sensor-function-equipped displays having thresholds. Further, in an embodiment of the invention, when two or more sensor-function-equipped marks for detecting state abnormality of the same management state exist, the marks have different thresholds at which state abnormality is determined. For example, when the threshold of the mark read by visual observation at which state abnormality is determined is set more strictly than the threshold of the mark read by a machine, it is possible that, in a case where the mark read by visual observation determines that a management state is normal, the mark read by a machine also determines that the management state is normal with high probability even in a case where there is variation in characteristics of the marks. With this, it is possible to reduce variation in determination among employees and maintain consistency of product management.

BRIEF DESCRIPTION OF DRAWINGS

FIG. 2 is a view for explaining a barcode or mark according to a second example of the invention, a product on which the barcode and mark are displayed, and a packaging article thereof.

FIG. 4 is a view illustrating examples of a sensor-function-equipped display of the invention.

DESCRIPTION OF EMBODIMENTS

Hereinafter, as an example of a barcode or mark according to the invention, a case where a barcode or mark is attached to a general product, a packaging article for packaging a product, a seal to be attached to a product, or the like and is applied to operation in a general convenience store, by a logistics provider, or by a business operator who stores products will be described with reference to the drawings.

FIRST EXAMPLE

Figure 1:
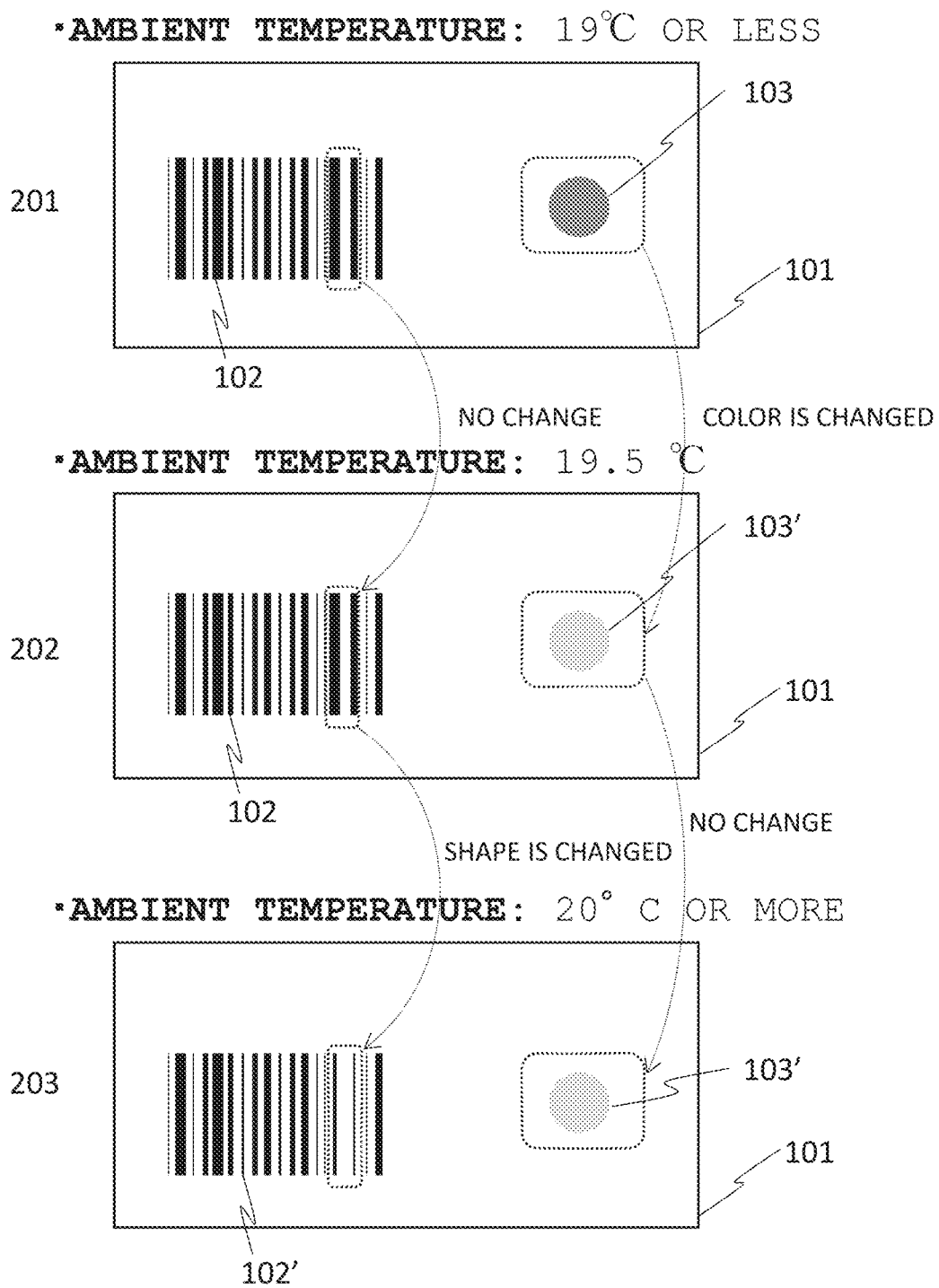
FIG. 1 is a view for explaining a barcode or mark according to a first example of the invention and a product on which the barcode and mark are displayed.

FIG. 1 is a view for explaining a sensor-function-equipped barcode and mark according to a first example of the invention. FIG. 1 illustrates a state in which color and shapes of two sensor-function-equipped marks printed on a marking target (101) such as a surface of a product or a seal are changed on the basis of a change in temperature. In this example, one of the two sensor-function-equipped marks is a sensor-function-equipped mark (102) suitable for machine reading, and the other one thereof is a sensor-function-equipped mark (103) suitable for reading by visual observation. However, the invention does not limit means for reading those sensor-function-equipped marks. Further, in this example, it is assumed that a quality management classification of a product that is a state management target of the sensor-function-equipped marks (102 and 103) is changed in an environment of 20° C. or more due to, for example, reduction in safety. However, in the invention, an external factor may be any external factor as long as the external factor may change the quality management classification of the product and is not limited to a temperature. Further, in the invention, a reason why the quality management classification of the product is changed is not limited to reduction in safety.

The sensor-function-equipped mark (102) suitable for machine reading in FIG. 1 is in the form of a barcode and is printed in a temperature-indicating ink. Therefore, in a case where 20° C. or more, which is a temperature at which the quality management classification of the product may be changed, is measured, a shape of the barcode is changed and the sensor-function-equipped mark (102) becomes a sensor-function-equipped mark (102'). Herein, the sensor-function-equipped mark (102') is the sensor-function-equipped mark (102) after the shape of the barcode is changed. Note that the sensor-function-equipped mark (102) does not need to be in the form of a barcode and may have any form as long as the form is suitable for machine reading such as a two-dimensional code.

Meanwhile, the sensor-function-equipped mark (103) suitable for reading by visual observation is printed in a circle in a temperature-indicating ink, and, as well as the sensor-function-equipped mark (102), color of the mark is changed in a case where the temperature at which the quality management classification of the product may be changed is measured. However, a threshold of the sensor-function-equipped mark (103) at which it is determined that the quality management classification of the product has been changed is set to be lower by 0.5° C. than the threshold of the sensor-function-equipped mark (102). Therefore, in a case where 19.5° C. or more is measured, the color of the mark is changed and the sensor-function-equipped mark (103) becomes a sensor-function-equipped mark (103'). The sensor-function-equipped mark (103') is the sensor-function-equipped mark (103) after the color of the mark is changed. Note that, regarding a form of this mark, a shape thereof does not need to be a circle and may be any shape such as an oval, a rectangle, or a rounded rectangle as long as the shape is suitable for visual observation. However, the mark (102) suitable for machine reading and the mark (103) suitable for reading by visual observation preferably have different forms.

Examples of a material used for the temperature-indicating ink encompass an inorganic thermochromic material made of a metallic complex such as $CoCl_2$ and an organic thermochromic material made of a condensed aromatic substitute such as a spiropyran-based compound. By using those materials for the ink and leaving the ink in an environment of a temperature zone designed in advance for a certain period of time or more, the color of the mark can be changed. When this temperature zone to be designed is set to be a temperature at which the quality management classification of the product may be changed, it is possible to determine where the quality management classification of the product belongs on the basis of the mark. Further, by using a similar ink, the shape of the mark can also be changed by causing the color of the mark and color of the marking target (101) to match or differ after the color is changed. The invention does not limit those materials and may use any arbitrary material as long as the material is a material with which an external factor that may change the quality management classification of the product can be measured. Further, marks having different thresholds can be realized by changing the kind of material, a composition ratio of materials, or the like.

A reference sign (201) in FIG. 1 indicates a state of the sensor-function-equipped marks (102) and (103) when an ambient temperature is 19° C. or less. When the ambient temperature is 19° C. or less, the sensor-function-equipped marks (102) and (103) maintain initial color and shapes because both the thresholds thereof are equal to or less than thresholds at which the color and shapes thereof are changed.

A reference sign (202) in FIG. 1 indicates a state of the sensor-function-equipped marks (102) and (103) when the ambient temperature is 19.5° C. The threshold of a change in color of the sensor-function-equipped mark (103) suitable for reading by visual observation is 19.5° C., and therefore the color is changed to pale color, as compared to initial color, and the sensor-function-equipped mark (103) becomes the sensor-function-equipped mark (103'). Meanwhile, the sensor-function-equipped mark (102) suitable for machine reading maintains an initial shape because the threshold thereof is 20° C. At this time, in this example, the color of the sensor-function-equipped mark (103') is paler than the color of the sensor-function-equipped mark (103). However, the invention does not limit the color of the sensor-function-equipped mark (103) or the color of the sensor-function-equipped mark (103').

A reference sign (203) in FIG. 1 indicates a state of the sensor-function-equipped marks (102) and (103) when the ambient temperature is 20° C. or more. The sensor-function-equipped mark (103) has already been changed to the sensor-function-equipped mark (103') at 19.5° C. Meanwhile, the threshold of a change in the shape of the barcode of the sensor-function-equipped mark (102) is 20° C., and therefore the shape of the barcode is changed and the sensor-function-equipped mark (102) becomes the sensor-function-equipped mark (102'). At this time, the invention does not limit the shape of the sensor-function-equipped mark (102'). However, examples of the shape encompass a change to a shape that cannot be easily read by a machine and a change to a shape of the barcode indicating that the quality management classification of the product has been changed.

As described above, when the threshold of the sensor-function-equipped mark (103) at which it is determined that the quality management classification of the product has been changed is set to be lower than the threshold of the sensor-function-equipped mark (102), the sensor-function-equipped mark (103) can determine that the quality management classification of the product has been changed in a stricter condition than the condition of the sensor-function-equipped mark (102). As a result, in, for example, a store that sells food, an employee confirms that the sensor-function-equipped mark (103) has not been changed to the sensor-function-equipped mark (103') by visual observation and, when the employee determines that the quality management classification of the product has not been changed, the sensor-function-equipped mark (102) is also not changed to the sensor-function-equipped mark (102') with high probability. Therefore, when the sensor-function-equipped mark is read by a machine such as a barcode reader, no change in the quality management classification of the product is displayed. Therefore, there is no conflict of determination of the quality management classification of the product between the sensor-function-equipped mark (103) and the sensor-function-equipped mark (102), and thus it is possible to avoid variation in determination among employees and loss of consistency of product management.

SECOND EXAMPLE

FIG. 2 illustrates an example where, as information regarding a quality management classification of a product, sensor-function-equipped marks (113), (114), (115), and (116) suitable for machine reading or reading by visual observation, as well as the sensor-function-equipped marks (102) and (103) described in the first example, are printed on two different marking targets (111) and (112). However, the invention does not limit means for reading those sensor-function-equipped marks.

As illustrated in FIG. 2, in a case where products such as medicine or food are transported or stored, in some cases, sensor-function-equipped marks (or seals or the like on which the marks are printed) are attached to product main bodies and a packaging article in which those products are packaged in order to guarantee quality of the products. At this time, when the packaging article in which the products are packaged is sealed, the sensor-function-equipped marks attached to the products therein cannot be read. Therefore, for example, a sensor-function-equipped mark is attached to the packaging article instead of all the products in the packaging article or one of the products in the packaging article can be seen from the outside of the packaging article. A manager of the products determines quality management classifications of all the products in the packaging article on the basis of this representative sensor-function-equipped mark. However, in a case where there is variation in qualities of the sensor-function-equipped marks, although the sensor-function-equipped mark representing management of the quality management classifications of all the products in the packaging article displays no change in the quality management classifications of the products, the sensor-function-equipped marks attached to all or a part of the products therein display a change in the quality management classifications of the products in some cases, as opposed to the representative mark, when the packaging article is opened. At this time, determination among managers of the products may vary and consistency of product management may be lost, and therefore, in order to avoid this, it is necessary that, when the representative sensor-function-equipped mark displays no change in the quality management classifications of the products, the sensor-function-equipped mark of each product also displays no change in the quality management classification of the product with high probability. This can be realized by using the invention.

In FIG. 2, it is assumed that the marking target (112) is, for example, a product such as medicine or food and a quality management classification is changed in an environment of an ambient temperature of 5° C. or more due to, for example, reduction in safety. The marking target (111) is a packaging article for packaging the marking target (112). The sensor-function-equipped marks (113) and (115) are attached to the marking target (111), and the sensor-function-equipped marks (114) and (116) are attached to the marking target (112).

The sensor-function-equipped mark (116), as well as the sensor-function-equipped mark (102), is suitable for machine reading and is in the form of a barcode. Further, this mark is printed in a temperature-indicating ink, and, in a case where 5° C. or more which is a temperature at which the quality management classification of the product may be changed is measured, a shape of the barcode is changed and the sensor-function-equipped mark (116) becomes a sensor-function-equipped mark (116'). Herein, the sensor-function-equipped mark (116') is the sensor-function-equipped mark (116) after the shape of the barcode of the mark is changed.

The sensor-function-equipped mark (115), as well as the sensor-function-equipped mark (102), is suitable for machine reading and is in the form of a barcode. Further, this mark is printed in a temperature-indicating ink, and, in a case where a temperature at which the quality management classification of the product may be changed is measured, a shape of the barcode is changed. However, a threshold of the sensor-function-equipped mark (115) at which it is determined that the quality management classification of the product has been changed is set to be lower by 0.5° C. than the threshold of the sensor-function-equipped mark (116). Therefore, in a case where 4.5° C. or more is measured, the shape of the barcode is changed and the sensor-function-equipped mark (115) becomes a sensor-function-equipped mark (115'). Herein, the sensor-function-equipped mark (115') is the sensor-function-equipped mark (115) after the shape of the barcode is changed. Note that the sensorfunction-equipped marks (115) and (116) do not need to be in the form of a barcode and may have any form as long as the form is suitable for machine reading such as a two-dimensional code.

The sensor-function-equipped mark (114), as well as the sensor-function-equipped mark (103), is suitable for reading by visual observation. Further, this mark is printed in a circle in a temperature-indicating ink, and, in a case where 5° C. or more, which is the temperature at which the quality management classification of the product may be changed, is measured, color of the mark is changed and the sensor-function-equipped mark (114) becomes a sensor-function-equipped mark (114'). Herein, the sensor-function-equipped mark (114') is the sensor-function-equipped mark (114) after the color of the mark is changed.

The sensor-function-equipped mark (113), as well as the sensor-function-equipped mark (103), is suitable for reading by visual observation. Further, this mark is printed in a circle in a temperature-indicating ink, and color of the mark is changed in a case where a temperature at which the quality management classification of the product may be changed is measured. However, a threshold of the sensor-function-equipped mark (113) at which it is determined that the quality management classification of the product has been changed is set to be lower by 0.5° C. than the threshold of the sensor-function-equipped mark (114). Therefore, in a case where 4.5° C. or more is measured, the color of the mark is changed and the sensor-function-equipped mark (113) becomes a sensor-function-equipped mark (113'). Herein, the sensor-function-equipped mark (113') is the sensor-function-equipped mark (113) after the color of the mark is changed. Note that, regarding forms of the sensor-function-equipped marks (113) and (114), shapes thereof do not need to be a circle and may be any shapes such as an oval, a rectangle, or a rounded rectangle as long as the shapes are suitable for visual observation. However, the marks (113) and (114) suitable for reading by visual observation and the marks (115) and (116) suitable for machine reading preferably have different forms.

A reference sign (204) in FIG. 2 indicates a state of the sensor-function-equipped marks ((113), (114), (115), (116) when an ambient temperature is 4° C. or less. When the ambient temperature is 4° C. or less, the sensor-function-equipped marks (113), (114), (115), and (116) maintain initial color and shapes because all the thresholds thereof are equal to or less than thresholds at which the color thereof is changed.

A reference sign (205) in FIG. 2 indicates a state of the sensor-function-equipped marks (113), (114), (115), and (116) when the ambient temperature is 4.5° C. The thresholds of a change in the color or shapes of the sensor-function-equipped marks (113) and (115) are 4.5° C. Therefore, the color of the sensor-function-equipped mark (113) is changed to pale color, as compared to initial color, and the sensor-function-equipped mark (113) becomes the sensor-function-equipped mark (113'). The shape of the barcode of the sensor-function-equipped mark (115) is also changed and the sensor-function-equipped mark (115) becomes the sensor-function-equipped mark (115'). Meanwhile, the sensor-function-equipped marks (114) and (116) maintain initial color and shapes because the thresholds of a change in the color and shapes thereof are 5° C.

A reference sign (206) in FIG. 2 indicates a state of the sensor-function-equipped marks (113), (114), (115), and (116) when the ambient temperature is 5° C. or more. The thresholds of a change in the color or shapes of the sensor-function-equipped marks (114) and (116) are 5° C. Therefore, the color of the sensor-function-equipped mark (114) is changed to pale color, as compared to initial color and the sensor-function-equipped mark (114) becomes the sensor-function-equipped mark (114'). Similarly, the shape of the barcode of the sensor-function-equipped mark (116) is also changed and the sensor-function-equipped mark (116) becomes the sensor-function-equipped mark (116'). Meanwhile, the sensor-function-equipped marks (113) and (115) have already been changed to the sensor-function-equipped marks (113') and (115') at 4.5° C.

As described above, when the thresholds of the sensor-function-equipped marks (113) and (115) at which it is determined that the quality management classification of the product may be changed are set to be lower than the thresholds of the sensor-function-equipped marks (114) and (116), the sensor-function-equipped marks (113) and (115) can determine that the quality management classification of the product has been changed in a stricter condition than the conditions of the sensor-function-equipped marks (114) and (116). As a result, in a case where products are packaged in a packaging article and are transported or stored and when the sensor-function-equipped marks (113) and (115) representing management of the quality management classifications of all the products in the packaging article display no change in the quality management classifications of the products, the sensor-function-equipped marks (114) and (116) of each product also display no change in the quality management classification of the product with high probability. Therefore, there is no conflict of determination of the quality management classifications of the products between the sensor-function-equipped marks (113) and (115) and the sensor-function-equipped marks (114) and (116), and thus it is possible to avoid variation in determination among product managers and loss of consistency of product management. Further, a avoidance method of a conflict of determination of the quality management classification of the product between the sensor-function-equipped mark (113) and (115) or between the sensor-function-equipped marks (114) and (116) can be solved by using the first example.

In FIG. 2 illustrating this example, the four sensor-function-equipped marks (113), (114), (115), and (116) are attached. However, the invention does not limit the number of sensor-function-equipped marks suitable for machine reading and reading by visual observation attached to the marking target (111) and the marking target (112) or a combination thereof.

THIRD EXAMPLE

Figure 3:
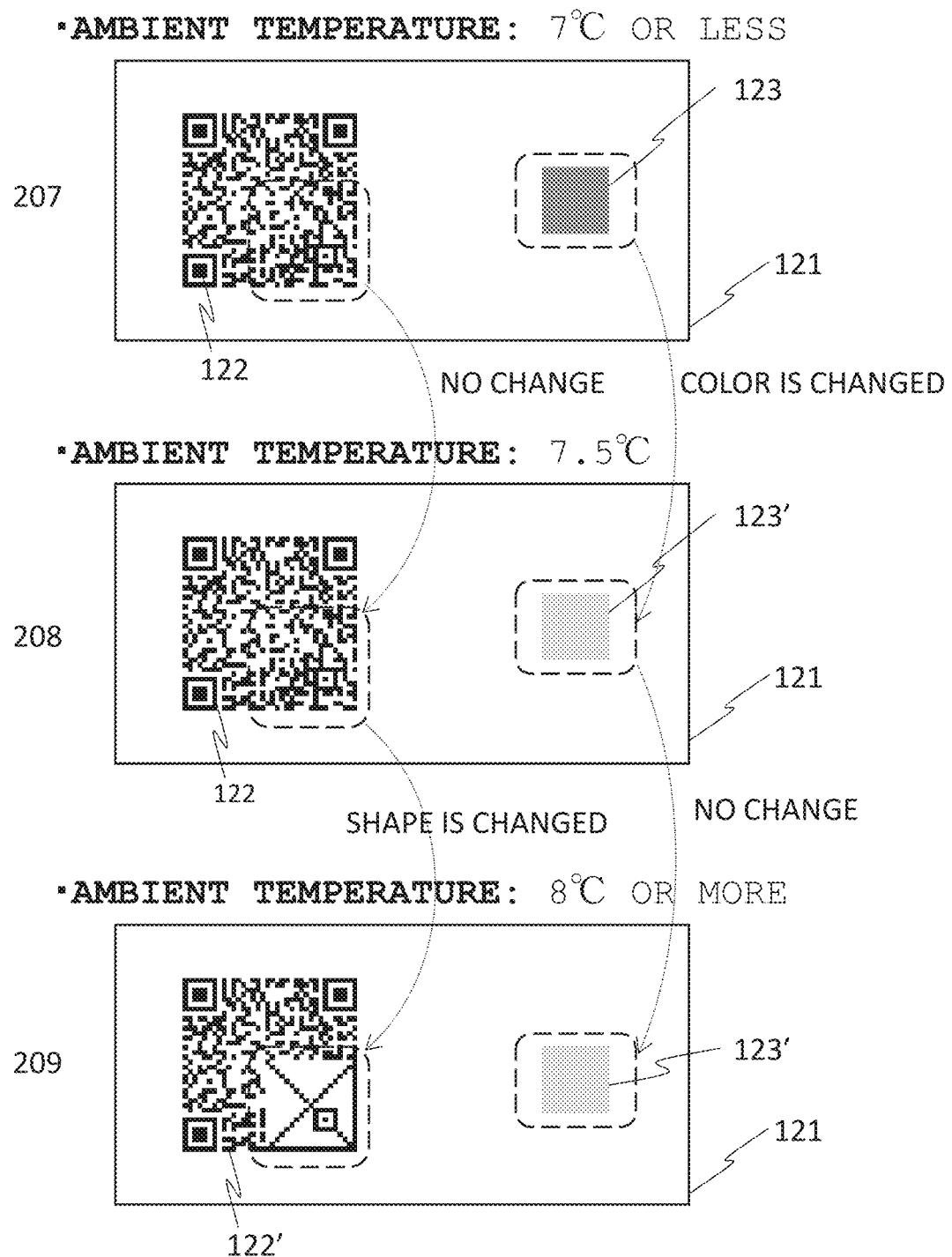
FIG. 3 is a view for explaining displays according to a third example of the invention, an article on which those displays are displayed, and a packaging article thereof.

FIG. 3 illustrates a state in which color and shapes of two sensor-function-equipped marks printed on a marking target (121) such as a surface of a product or a seal are changed on the basis of a change in temperature. In this example, one of the two sensor-function-equipped marks is a machine-reading sensor-function-equipped mark (122) suitable for machine reading, and the other one thereof is a visual-observation sensor-function-equipped mark (123) suitable for reading by visual observation. However, the invention does not limit means for reading those sensor-function-equipped marks. Further, in this example, it is assumed that a quality management classification of a product that is a state management target of the machine-reading and visual-observation sensor-function-equipped marks (122 and 123) is changed in an environment of 8° C. or more due to, for example, reduction in safety. However, in the invention, an external factor may be any external factor as long as the external factor may change the quality management classification of the product and is not limited to a temperature. Further, in the invention, a reason why the quality management classification of the product is changed is not limited to reduction in safety.

The machine-reading sensor-function-equipped mark (122) suitable for machine reading in FIG. 3 is a one-dimensional barcode or two-dimensional barcode and is printed in a temperature-indicating ink. Therefore, in a case where 8° C. or more, which is a temperature at which the quality management classification of the product may be changed, is measured, a shape of the barcode is changed and the machine-reading sensor-function-equipped mark (122) becomes a machine-reading sensor-function-equipped mark (122'). Herein, the machine-reading sensor-function-equipped mark (122') is the machine-reading sensor-function-equipped mark (122) after the shape of the one-dimensional barcode or two-dimensional barcode is changed and is a one-dimensional barcode or two-dimensional barcode similar to the machine-reading sensor-function-equipped mark (122). Note that, in this example, a threshold of the temperature at which the shape of the barcode of the machine-reading sensor-function-equipped mark (122) is changed and the machine-reading sensor-function-equipped mark (122) becomes the machine-reading sensor-function-equipped mark (122') is a temperature at which the quality management classification of the product may be changed and does not need to be 8° C.

Meanwhile, the visual-observation sensor-function-equipped mark (123) suitable for reading by visual observation is printed in a temperature-indicating ink, and, as well as the machine-reading sensor-function-equipped mark (122), color of the mark is changed in a case where the temperature at which the quality management classification of the product may be changed is measured. This visual-observation sensor-function-equipped mark (123) may be a stamp seal (301), a signature (302), a corporate mark (303), an emblem (304), a family crest (305), a logotype (306), a design drawing (307), a circle (308), an oval (309), a star (310), a triangle (311), a rectangle (312), a polygon (313), an x-mark (314), an arrow (315), and a message (316) illustrated in FIG. 4 or an HTTP, a URL, an address, a telephone number, a product number, a postal code, a trade name, a corporate name, a picture, a check mark, a letter, and an icon which are not illustrated in FIG. 4 (hereinafter, referred to as "stamp seal and the like"). Alternatively, the visual-observation sensor-function-equipped mark may also be a combination of two or more of those marks. A threshold of the visual-observation sensor-function-equipped mark (123) at which it is determined that the quality management classification of the product has been changed is set to be lower by 0.5° C. than the threshold of the machine-reading sensor-function-equipped mark (122). Therefore, in a case where 7.5° C. or more is measured, the color of the mark is changed and the visual-observation sensor-function-equipped mark (123) becomes a visual-observation sensor-function-equipped mark (123'). The visual-observation sensor-function-equipped mark (123') is the visual-observation sensor-function-equipped mark (123) after the color of the mark is changed. Note that, in this example, the temperature at which the color or shape of the visual-observation sensor-function-equipped mark (123) is changed and the visual-observation sensor-function-equipped mark (123) becomes the visual-observation sensor-function-equipped mark (123') is restricted more strictly than the temperature at which the quality management classification of the product may be changed and does not need to be 7.5° C. Herein, the temperature stricter than the temperature at which the quality management classification of the product may be changed means, for example, a temperature less than 8° C. in a case where the product is required to have 8° C. or less. Further, a difference between the threshold of the visual-observation sensor-function-equipped mark (122) and the threshold at which it is determined that the quality management classification of the product has been changed is not limited to 0.5° C.

Examples of a material used for the temperature-indicating ink encompass an inorganic thermochromic material made of a metallic complex such as CoCl2 and an organic thermochromic material made of a condensed aromatic substitute such as a spiropyran-based compound. By using those materials for the ink and leaving the ink in an environment of a temperature zone designed in advance for a certain period of time or more, the color of the mark can be changed. When this temperature zone to be designed is set to be a temperature at which the quality management classification of the product may be changed, it is possible to determine where the quality management classification of the product belongs on the basis of the mark. Further, by using a similar ink, the shape of the mark can also be changed by causing the color of the mark and color of the marking target (121) to match or differ after the color is changed. The invention does not limit those materials and may use any arbitrary material as long as the material is a material with which an external factor that may change the quality management classification of the product can be measured. Further, marks having different thresholds can be realized by changing the kind of material, a composition ratio of materials, or the like.

A reference sign (207) in FIG. 3 indicates a state of the machine-reading sensor-function-equipped marks (122) and the visual-observation sensor-function-equipped mark (123) when an ambient temperature is 7° C. or less. When the ambient temperature is 7° C. or less, the machine-reading sensor-function-equipped marks (122) and the visual-observation sensor-function-equipped mark (123) maintain initial color and shapes because both the thresholds thereof are equal to or less than thresholds at which the color and shapes thereof are changed.

A reference sign (208) in FIG. 3 indicates a state of the machine-reading sensor-function-equipped mark (122) and the visual-observation sensor-function-equipped mark (123) when the ambient temperature is 7.5° C. The threshold of a change in color of the visual-observation sensor-function-equipped mark (123) suitable for reading by visual observation is 7.5° C., and therefore the color is changed to pale color, as compared to initial color, and the visual-observation sensor-function-equipped mark (123) becomes the sensor-function-equipped mark (123'). Meanwhile, the machine-reading sensor-function-equipped mark (122) suitable for machine reading maintains an initial shape because the threshold thereof is 8° C. At this time, in this example, the color of the visual-observation sensor-function-equipped mark (123') is paler than the color of the visual-observation sensor-function-equipped mark (123). However, the invention does not limit the color of the visual-observation sensor-function-equipped mark (123) or the color of the visual-observation sensor-function-equipped mark (123'). Further, in a case where the visual-observation sensor-function-equipped mark (123) and the visual-observation sensor-function-equipped mark (123') have different shapes, the visual-observation sensor-function-equipped mark (123') has a form of one of the stamp seal and the like or a combination of two or more thereof or disappears so that the visual-observation sensor-function-equipped mark (123')

cannot be seen. In a case where the visual-observation sensor-function-equipped mark (123') has a form of one of the stamp seal and the like or a combination of two or more thereof, the visual-observation sensor-function-equipped mark (123) may be in a state in which the visual-observation sensor-function-equipped mark (123) cannot be seen by visual observation.

A reference sign (209) in FIG. 3 indicates a state of the machine-reading sensor-function-equipped mark (122) and the visual-observation sensor-function-equipped mark (123) when the ambient temperature is 8° C. or more. The visual-observation sensor-function-equipped mark (123) has already been changed to the visual-observation sensor-function-equipped mark (123') at 7.5° C. Meanwhile, the threshold of a change in the shape of the barcode of the machine-reading sensor-function-equipped mark (122) is 8° C., and therefore the shape of the barcode is changed and the machine-reading sensor-function-equipped mark (122) becomes the machine-reading sensor-function-equipped mark (122'). At this time, a form of the machine-reading sensor-function-equipped mark (122') is a one-dimensional barcode or two-dimensional barcode.

As described above, when the threshold of the visual-observation sensor-function-equipped mark (123) at which it is determined that the quality management classification of the product has been changed is set to be lower than the threshold of the machine-reading sensor-function-equipped mark (122), the visual-observation sensor-function-equipped mark (123) can determine that the quality management classification of the product has been changed in a stricter condition than the condition of the machine-reading sensor-function-equipped mark (122). As a result, in, for example, a store that sells food, when an employee confirms that the visual-observation sensor-function-equipped mark (123) has not been changed to the visual-observation sensor-function-equipped mark (123') by visual observation and determines that the quality management classification of the product has not been changed, the machine-reading sensor-function-equipped mark (122) is also not changed to the machine-reading sensor-function-equipped mark (122') with high probability. Therefore, when the sensor-function-equipped mark is read by a machine such as a barcode reader, no change in the quality management classification of the product is displayed. Therefore, there is no conflict of determination of the quality management classification of the product between the visual-observation sensor-function-equipped mark (123) and the machine-reading sensor-function-equipped mark (122), and thus it is possible to avoid variation in determination among employees and loss of consistency of product management.

In each example described above, an article includes a plurality of displays whose appearances are changed on the basis of a temperature that is the same kind of external factor, in which: a threshold of a temperature at which an appearance of the sensor-function-equipped mark 102, 122, or the like that is a first display is changed and a threshold of a temperature at which an appearance of the sensor-function-equipped mark 103, 123, or the like that is a second display is changed are different; and the appearance of the sensor-function-equipped mark 102, 122, or the like and the appearance of the sensor-function-equipped mark 103, 123, or the like are differently changed. Therefore, because a plurality of sensor-function-equipped displays having thresholds are simultaneously provided, it is possible to provide more preferable quality management. In a case where the first display is for machine reading and the second display is for reading by visual observation, it is possible to realize more preferable quality management in which characteristics of visual observation and machine reading are utilized.

In each example, an example where an article itself has the above displays has been mainly described. However, it is also possible to obtain the same kind of effect by attaching a member such as a seal having those displays to an article or the like.

In each example, as an example of more preferable quality management, in a case where a predetermined quality management classification is changed from normality to abnormality, the thresholds of the first display and the second display are set so that the appearance of the first display is changed before the appearance of the second display is changed. For example, the first example shows an example of a classification in which it is determined that safety is reduced when a temperature exceeds 20° C. As in each example, when a threshold of a mark read by visual observation at which state abnormality is determined is set more strictly than a threshold of a mark read by a machine, it is possible that, in a case where the mark read by visual observation determines that a management state is normal, the mark read by a machine also determines that the management state is normal with high probability even in a case where there is variation in characteristics of the marks. With this, it is possible to reduce variation in determination among employees and maintain consistency of product management.

Herein, the term "external factor" is, for example, a temperature, humidity, ultraviolet rays, and shock, and the wording "same kind" means the same in the kind of these examples (temperature and the like). Further, the wording "change in appearance" means a change in a shape of a display itself (for example, part of bar of barcode disappears), a change in color thereof, and the like. The wording "appearances are differently changed" means that, for example, the first display is changed in shape and the second display is changed in color as the sensor-function-equipped mark 102 and the sensor-function-equipped mark 103 described in the first example. It is possible to realize more preferable management, as compared to a case of using displays in which multiple forms are simply set in accordance with strength.

REFERENCE SIGNS LIST

101 . . . marking target such as surface of product or seal
102 . . . sensor-function-equipped mark suitable for machine reading (before change)
102' . . . sensor-function-equipped mark suitable for machine reading (after change)
103 . . . sensor-function-equipped mark suitable for reading by visual observation (before change)
103' . . . sensor-function-equipped mark suitable for reading by visual observation (after change)
111 . . . marking target (packaging article)
112 . . . marking target (product)
113 . . . sensor-function-equipped mark suitable for reading by visual observation (before change) attached to marking target (111)
113' . . . sensor-function-equipped mark suitable for reading by visual observation (after change) attached to marking target (111)
114 . . . sensor-function-equipped mark suitable for reading by visual observation (before change) attached to marking target (112)

114' . . . sensor-function-equipped mark suitable for reading by visual observation (after change) attached to marking target (112)
115 . . . sensor-function-equipped mark suitable for machine reading (before change) attached to marking target (111)
115' . . . sensor-function-equipped mark suitable for machine reading (after change) attached to marking target (111)
116 . . . sensor-function-equipped mark suitable for machine reading (before change) attached to marking target (112)
116' . . . sensor-function-equipped mark suitable for machine reading (after change) attached to marking target (112)
201 . . . state of sensor-function-equipped marks (102) and (103) when ambient temperature is 19° C. or less
202 . . . state of sensor-function-equipped marks (102) and (103) when ambient temperature is 19.5° C.
203 . . . state of sensor-function-equipped marks (102) and (103) when ambient temperature is 20° C. or more
204 . . . state of sensor-function-equipped marks (113) and (114) when ambient temperature is 4° C. or less
205 . . . state of sensor-function-equipped marks (113) and (114) when ambient temperature is 4.5° C.
206 . . . state of sensor-function-equipped marks (113) and (114) when ambient temperature is 5° C. or more

The invention claimed is:

1. An article, comprising:
a plurality of displays whose appearances are changed on the basis of the same kind of external factor, wherein
a threshold of the external factor that changes an appearance of a first display and a threshold of the external factor that changes an appearance of a second display are different;
the appearances of the first display and the second display are differently changed;
the first display is for machine reading and the second display is for reading by visual observation by a person; and
in a case where a predetermined quality management classification is changed from normality to abnormality, the threshold of the first display is set lower that the threshold of the second display so that the appearance of the first display for machine reading is changed before the appearance of the second display for reading by visual observation is changed.

2. The article according to claim 1, wherein the first display for machine reading is a barcode or matrix-type two-dimensional code.

3. The article according to claim 1, wherein the second display for reading by visual observation includes one of a stamp seal, a signature, a corporate mark, a family crest, an HTTP, a URL, an address, a telephone number, a product number, a postal code, a trade name, a corporate name, a picture, an emblem, a check mark, a design drawing, a letter, an icon, an oval, a star, a triangle, a rectangle, an x-mark, a polygon, and a circle.

4. The article according to claim 1, wherein a change in the appearance of the first display is a change in the appearance, and a change in a shape of the second display is a change in color.

5. The article according to claim 1, wherein the external factor is a temperature.

6. The article according to claim 1, wherein the first display and the second display have three kinds of states based on strength of the external factor, including a first state in which both the first display and the second display are not changed, a second state in which one of the first display and the second display is changed, and a third state in which both the first display and the second display are changed.

7. A packaging material for packaging the article according to claim 1, comprising
a third display and fourth display whose appearances are changed on the basis of the external factor, wherein
the displays included in the article and the displays included in the packaging material have different thresholds of the external factor that changes the appearances.

8. The packaging material according to claim 7, wherein
in a case where a predetermined quality management classification is changed from normality to abnormality, the thresholds of the first to fourth displays are set so that the appearances of the third and fourth displays are changed before the appearances of the first and second displays are changed.

9. The article according to claim 7, wherein
the third display is for machine reading and the fourth display is for reading by visual observation, and, in a case where a predetermined quality management classification is changed from normality to abnormality, the thresholds of the third display and the fourth display are set so that the appearance of the third display is changed before the appearance of the fourth display is changed.

10. A sensor-function-equipped member, comprising
a plurality of displays whose appearances are changed on the basis of the same kind of external factor, wherein:
a threshold of the external factor that changes an appearance of a first display and a threshold of the external factor that changes an appearance of a second display are different;
the appearances of the first display and the second display are differently changed;
the first display is for machine reading and the second display is for reading by visual observation; and
in a case where a predetermined quality management classification is changed from normality to abnormality, the threshold of the first display is set lower that the threshold of the second display so that the appearance of the first display for machine reading is changed before the appearance of the second display for reading by visual observation is changed.

11. A quality management method of an article including a plurality of displays whose appearances are changed on the basis of the same kind of external factor, wherein:
a threshold of the external factor that changes an appearance of a first display and a threshold of the external factor that changes an appearance of a second display are different;
the first display is read by visual observation and the second display is read by a machine;
the first display is for machine reading and the second display is for reading by visual observation; and
in a case where a predetermined quality management classification is changed from normality to abnormality, the threshold of the first display is set lower that the threshold of the second display so that the appearance of the first display for machine reading is changed before the appearance of the second display for reading by visual observation is changed.

* * * * *